United States Patent
Perrot et al.

(10) Patent No.: US 8,085,770 B2
(45) Date of Patent: Dec. 27, 2011

(54) METHOD OF TRANSPORTING A MULTIPOINT STREAM IN A LOCAL AREA NETWORK AND DEVICE FOR CONNECTION IMPLEMENTING THE METHOD

(75) Inventors: Sébastien Perrot, Rennes (FR); Gilles Straub, Acigne (FR)

(73) Assignee: Thomson Licensing, Boulogne-Billancourt (FR)

( * ) Notice: Subject to any disclaimer, the term of this patent is extended or adjusted under 35 U.S.C. 154(b) by 1161 days.

(21) Appl. No.: 11/053,625

(22) Filed: Feb. 8, 2005

(65) Prior Publication Data

US 2005/0180440 A1 Aug. 18, 2005

(30) Foreign Application Priority Data

Feb. 17, 2004 (FR) ..................................... 04 01578

(51) Int. Cl.
*H04L 12/28* (2006.01)
(52) U.S. Cl. ........................................ 370/390; 370/401
(58) Field of Classification Search ........................ None
See application file for complete search history.

(56) References Cited

U.S. PATENT DOCUMENTS

| | | | | |
|---|---|---|---|---|
| 6,385,647 B1 * | 5/2002 | Willis et al. | ................... | 709/217 |
| 6,611,872 B1 * | 8/2003 | McCanne | ...................... | 709/238 |
| 6,687,247 B1 * | 2/2004 | Wilford et al. | ................. | 370/392 |
| 6,873,627 B1 * | 3/2005 | Miller et al. | ................... | 370/466 |
| 6,928,656 B1 * | 8/2005 | Addington | .................... | 725/111 |
| 7,075,904 B1 * | 7/2006 | Manish et al. | ................. | 370/312 |
| 7,260,079 B1 * | 8/2007 | Chapman et al. | .............. | 370/338 |
| 7,296,091 B1 * | 11/2007 | Dutta et al. | ................... | 709/245 |
| 7,339,928 B2 * | 3/2008 | Choyi et al. | ................... | 370/390 |
| 2002/0026482 A1 * | 2/2002 | Morishige et al. | ............ | 709/206 |
| 2002/0143951 A1 | 10/2002 | Khan et al. | | |
| 2003/0031175 A1 * | 2/2003 | Hayashi et al. | ................ | 370/390 |
| 2003/0063591 A1 * | 4/2003 | Leung et al. | ................... | 370/338 |
| 2003/0231629 A1 * | 12/2003 | Banerjee et al. | .............. | 370/390 |
| 2004/0100983 A1 * | 5/2004 | Suzuki | ........................... | 370/432 |
| 2005/0111474 A1 * | 5/2005 | Kobayashi | ..................... | 370/432 |
| 2005/0135291 A1 * | 6/2005 | Ketchum et al. | .............. | 370/319 |

(Continued)

FOREIGN PATENT DOCUMENTS

EP 0 902 569 A1 3/1999

(Continued)

OTHER PUBLICATIONS

Robert Rummler, et al., 'A New Multicast Protocol for UMTS', Centre for Telecommunications Research, King's College London, Mobile Telecommunication Research Laboratory, Electronics and Telecommunications Research Institute, pp. 687-691.

(Continued)

*Primary Examiner* — Phirin Sam
(74) *Attorney, Agent, or Firm* — Robert D. Shedd; Joseph J. Opalach

(57) ABSTRACT

Within the framework of a wireless local area network, the reliability of the transporting of the multicast streams is not enhanced by an acknowledgement of receipt mechanism. To improve this reliability the invention proposes a method of transporting packets transmitted in multicast mode by a device for connection between a first network and a second network, the multicast packets originating from the second network destined for clients of the first network, characterized in that it comprises a step of reception of multicast packets and the despatching according to a unicast transmission mode of at least certain packets transmitted in multicast mode to at least one of the clients of the first network that are subscribers to the transmission group.

5 Claims, 8 Drawing Sheets

U.S. PATENT DOCUMENTS

| | | | |
|---|---|---|---|
| 2005/0152370 A1* | 7/2005 | Meehan et al. | 370/393 |
| 2005/0213545 A1* | 9/2005 | Choyi et al. | 370/338 |
| 2005/0286488 A1* | 12/2005 | Briscoe et al. | 370/351 |
| 2006/0034281 A1* | 2/2006 | Cain et al. | 370/390 |
| 2006/0242311 A1* | 10/2006 | Mai et al. | 709/229 |
| 2007/0233891 A1* | 10/2007 | Luby et al. | 709/231 |
| 2008/0144559 A1* | 6/2008 | Griswold et al. | 370/311 |
| 2010/0040056 A1* | 2/2010 | Kobayashi | 370/390 |
| 2010/0142432 A1* | 6/2010 | Leung et al. | 370/312 |

FOREIGN PATENT DOCUMENTS

| | | |
|---|---|---|
| EP | 0 967 753 A2 | 12/1999 |
| EP | 1259027 | 11/2002 |
| JP | 2002033736 | 1/2002 |
| JP | 200277254 | 3/2002 |
| JP | 2004040666 | 2/2004 |

OTHER PUBLICATIONS

Norihiro et al., "A Method of a Multipoint Video Conferencing Using a Multicast Network Technology and a Dynamic Rate Allocation Technology", IEIC Technical Report (Institute of Electronics, Information and Communication Engineers), vol. 99, No. 620, Japan, 2000, pages.

Yamada et al., "High-Capacity Content Distribution System MDS-Dome/Megacast for B to E/B to C, LSS", NTT Information Circulation Plateform Research Laboratories, Enterprise Technical Report 2004-00009-005.

* cited by examiner

METHOD OF TRANSPORTING A MULTIPOINT STREAM IN A LOCAL AREA NETWORK AND DEVICE FOR CONNECTION IMPLEMENTING THE METHOD

This application claims the benefit, under 35 U.S.C. §119 of French Patent Application 0401578, filed Feb. 17, 2004.

FIELD OF INVENTION

The present invention relates to the transporting of a multipoint stream over a network and more particularly the way in which the reliability of the distribution of this stream over a local area network can be enhanced in the case where the mechanism for multipoint distribution of this stream turns out not to be reliable on the local area network.

BACKGROUND OF THE INVENTION

On packet based information transfer networks, such as for example the Internet, IP local area networks or the like, several modes of information transfer are found. These modes may be classified into three categories as a function of the number of senders and of receivers engaged in this transporting. Firstly there is point-to-point transporting (or "unicasting") which allows a sender to despatch an information packet destined for a single receiver identified by his address on the network. This is the mode of transport used by the most popular protocols on the Internet network such as the HTTP web page transfer protocol ("Hypertext Transfer Protocol") or the File Transfer Protocol (FTP). Another mode of transport involves a sender transporting a packet in broadcasting mode. In this mode, the packet sent by the sender is sent to all the nodes of the network. This mode is not available on the Internet but is found on local area networks. The third mode involves a sender or a group of senders transporting a packet to a group of receivers, in a multipoint mode of transport (or "multicasting"). In this mode the packets are sent to an address called the multicast address and will be forwarded to all the recipients belonging to the transmission group. A client that joins a transmission group will be said to subscribe to the group and a client that leaves the group will be said to desubscribe from the group.

The multicast mode is used in practice to save intermediate bandwidth in the network when a source sends data to a group of recipients. Specifically, in this case, the use of a unicast mode of transport implies that the data are despatched as many times as there are recipients. This mode brings about the duplication of the packets over the parts of the network that are common to the paths between the source and the various recipients. On the other hand multicast makes it possible to despatch the data just once, these data being duplicated on the routers of the network, as a function of the paths leading to the recipients belonging to the transmission group. FIG. 1a illustrates the transmission of a data packet (P) sent by a node "S", the information source, to nodes "A", "B" and "C". It is seen that the packet "P" is duplicated three times between the node "S" and the router "R1", twice between the routers "R1" and "R2" in the case of the unicast transfer and is not duplicated in the case of the multipoint transfer illustrated by FIG. 1b. In this case, a single packet "P" is sent by the source "S", the router "R1" knows that the packet must be retransported on two branches out of three towards the node "A" and the router "R2" which itself transports it to the clients "B" and "C", the members of the group. The packet is not despatched towards the nodes "D" and "E" that are not members of the transmission group.

A local area network generally comprises a gateway linking the local area network proper and the exterior network, generally the Internet. To this gateway are connected, according to several possible technologies such as Ethernet, IEEE 1394 or technologies for wireless connection by radio, various local appliances. These appliances may access the exterior network via the gateway operating as router between the local area network and the exterior network. When a local appliance, the client, wishes to join a multipoint data transmission group, it subscribes to the multicast address, for example according to the IGMP Internet group management protocol, this protocol being known under the reference "RFC 3376" at the IETF (Internet Engineering Task Force". Following this subscription, the node is recognised as a member of the transmission group and the packets corresponding to this stream, and transmitted in multipoint mode, are routed from the Internet, via the gateway, to this client.

It may be that over the local area network, depending on the technology used, the multicast is not always performed dependably. For example, in the case where the local area network is a wireless network operating according to a protocol from the 802.11 family in version a, b or g, the packet transported is tested to see whether it is intact and packets that are not intact are discarded but not retransported. They are lost.

SUMMARY OF THE INVENTION

The invention makes it possible to improve the reliability of the transmission of multipoint packets between the gateway and the end client receiving these packets over a local area network. This reliability is ensured by transforming these multicast packets on the fly into unicast transmission packets before sending them to their recipient. Specifically, over the same networks the transporting of the packets according to the unicast method is made secure and a mechanism provides for the retransporting of the non-intact packets between the gateway and the client. To do this the gateway intercepts the requests for subscription of a client to a multicast address in such a way as to maintain an association between the said addresses and the subscriber clients. Subsequently, the gateway intercepts the packets transmitted in multipoint mode to these addresses and sends them in unicast mode to the subscriber clients.

The problems set forth above are solved by a method of transporting packets transmitted in multicast mode by a device for connection between a first network and a second network, the multipoint packets originating from the second network destined for clients of the first network, characterized in that it comprises a step of reception of multicast packets and the despatching according to a unicast transmission mode of at least certain packets transmitted in multicast mode to at least one of the clients of the first network that are subscribers to the transmission group.

According to a particular embodiment of the invention the method comprises a step of determining the addresses of the clients of the first network that are subscribers to the transmission group by the use of means of association associating with each multicast address, to which at least one client of the first network is a subscriber, the addresses of the clients that are subscribers to this address.

The method comprises a step of updating the information of the means of association by analysis of the subscription messages transported to the second network by the clients in the first network.

According to a particular embodiment of the invention the first network comprising only one client, the packets transmitted in multicast mode are transported directly in unicast mode to this single client.

According to a particular embodiment of the invention the first network is a wireless network implementing at least one protocol from the 802.11 family and where the device for connection is the point of access of this wireless network.

The problems are also solved by a device for connection between a second network and a first network possessing means of transporting the packets received in multicast mode from the second network destined for clients of the first network that are subscribers to the transmission group, characterized in that these means of transport comprise means of transporting in unicast mode of the said packets to the subscriber clients.

According to a particular embodiment of the invention the device for connection comprises means of association between the multicast addresses and the addresses of the subscriber clients.

According to a particular embodiment of the invention the means of association comprise means of analysis of the messages despatched by the clients so as to manage their subscription to the multicast groups.

BRIEF DESCRIPTION OF THE DRAWINGS

The invention will be better understood and other features and advantages will become apparent on reading the description which follows, the description making reference to the appended drawings among which.

DESCRIPTION OF PREFERRED EMBODIMENT

The invention is therefore a method of transforming on the fly a multicast stream arriving at the gateway of a local area network and destined for a client of the local area network into a unicast stream. The transformation takes place, for example, on the gateway, in any event in general, on an appliance through which the IP traffic destined for the appliance of the local area network travels. The standpoint of the exemplary embodiment which follows is the case where the network is a wireless network according to a protocol from the 802.11 family. This example is non-limiting and the invention may be used with other types of local area networks.

Figure 1A:
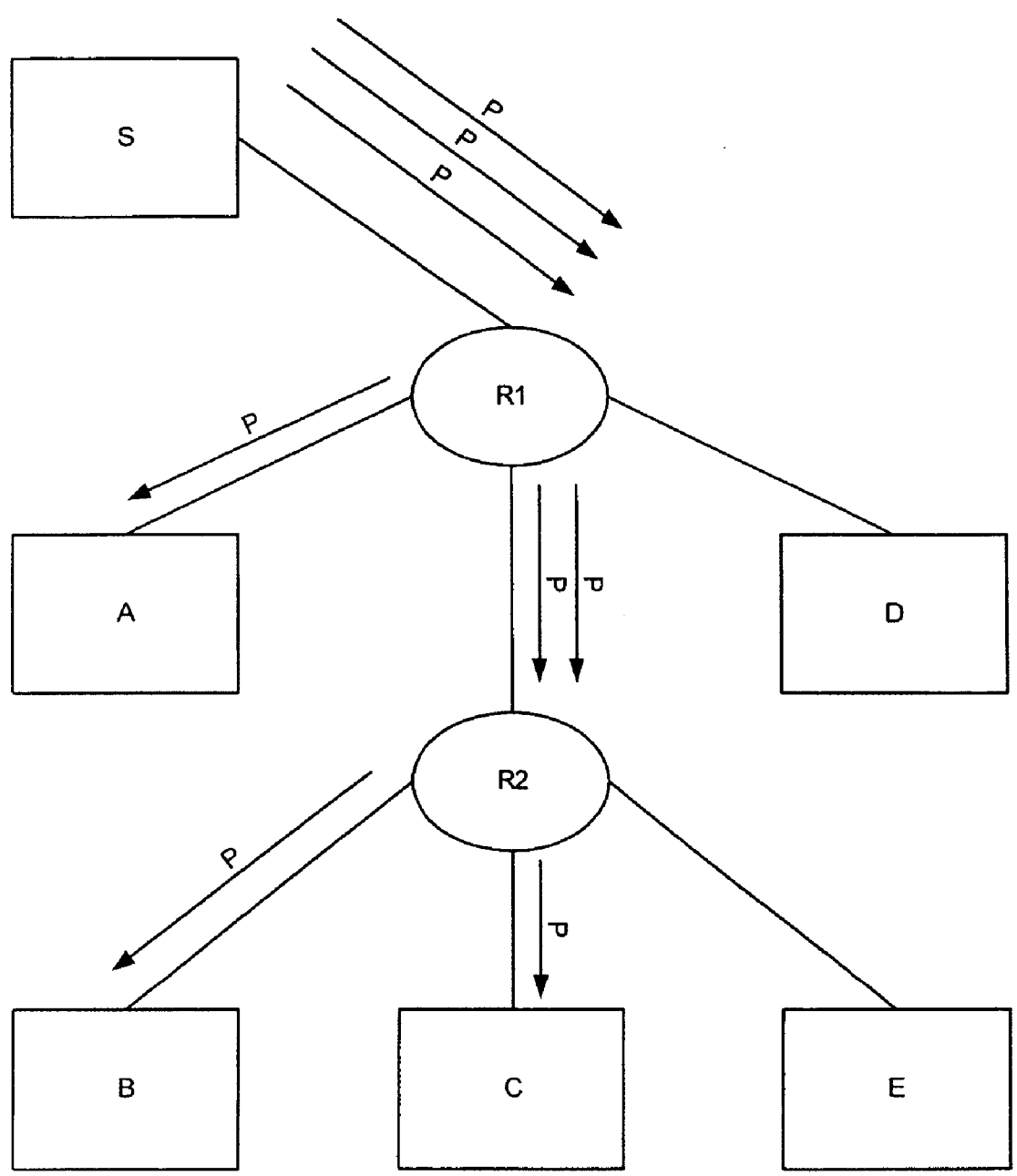
FIG. 1a illustrates the manner of operation of a unicast transmission of a packet to three recipients in a known manner.
Figure 1B:
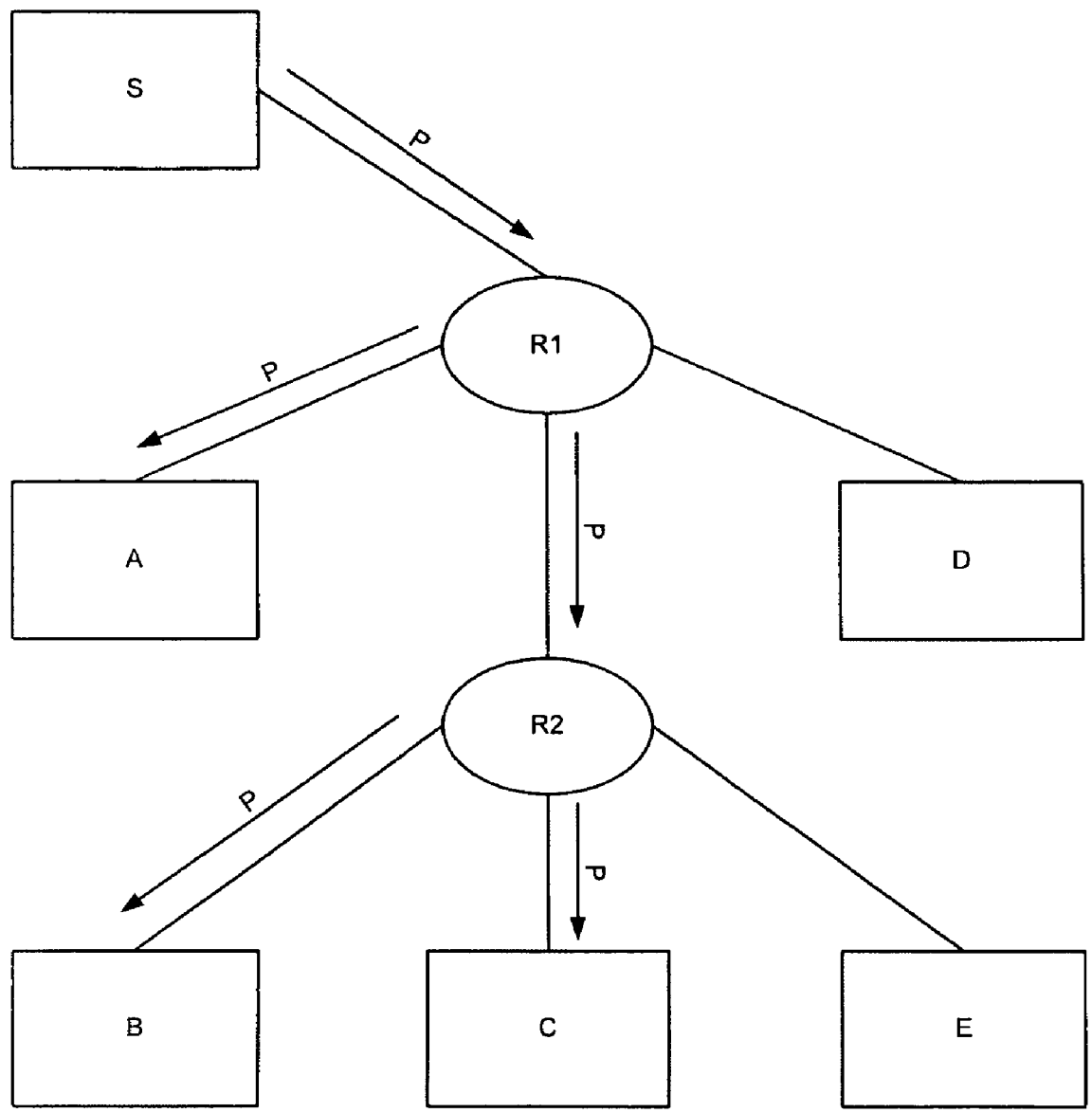
FIG. 1b illustrates the manner of operation of the same distribution in multicast mode in a known manner.
Figure 2:
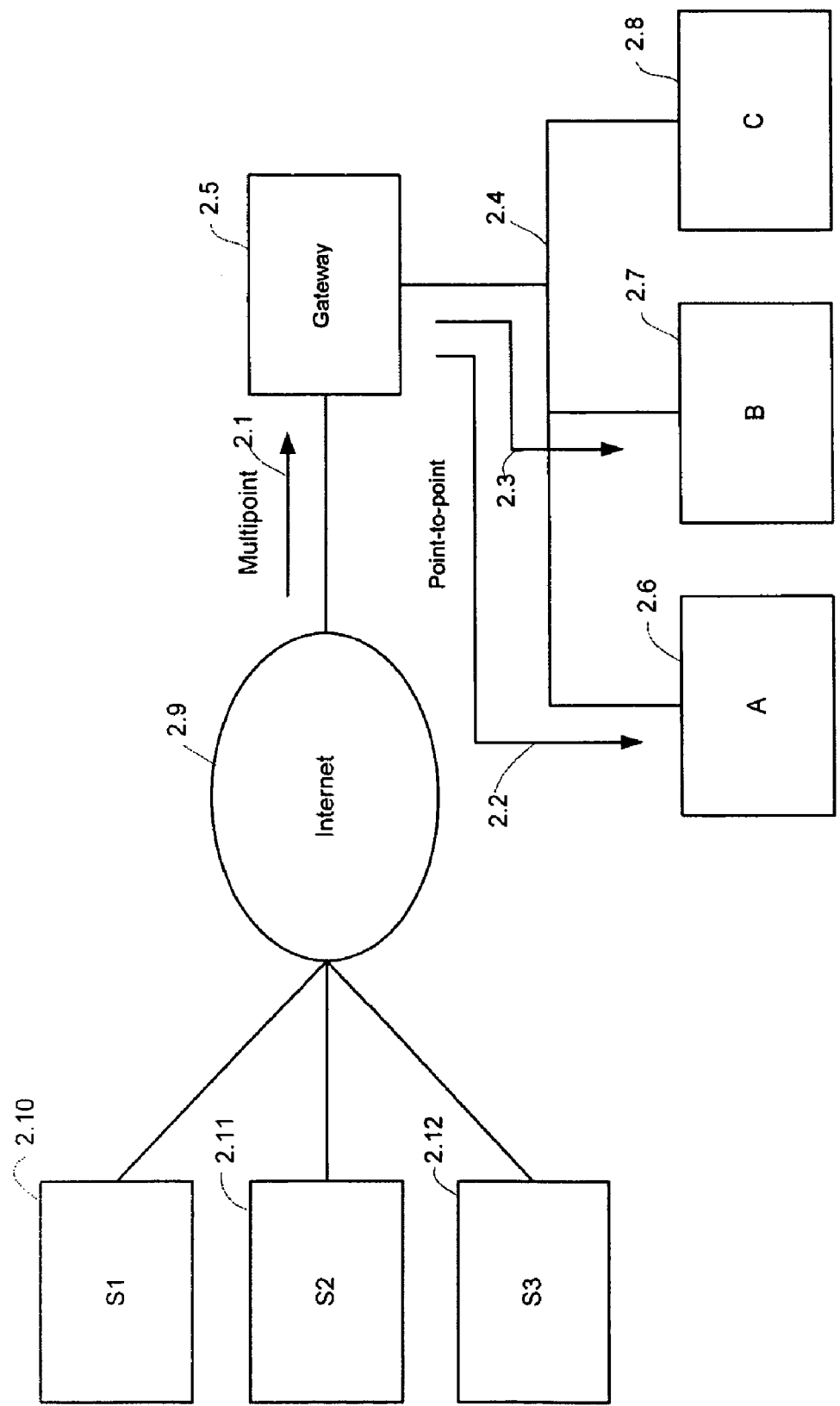
FIG. 2 illustrates a network operating according to an exemplary embodiment of the invention.

FIG. 2 illustrates the network of the exemplary embodiment of the invention. Found firstly therein are data sources S1, S2 and S3, referenced 2.10, 2.11 and 2.12, which are contents servers. These servers are connected to an external network, here the Internet, referenced 2.9. On the user side will be found a wireless local area network referenced 2.4 linking clients A, B and C, referenced 2.6, 2.7 and 2.8, and an access point serving as gateway, referenced 2.5, linking the local area network to the Internet. The wireless local area network is a network according to a protocol from the 802.11 family but could be based on some other technology. It transpires that the problem of reliability arises in a more acute manner in the case of a wireless network than in the case of a wire network such as an Ethernet network for example. The clients A, B and C are therefore potential clients for the information transmitted by the servers S1, S2 and S3. These clients will connect up to these transmissions for example by using the IGMP protocol. The clients will therefore signal their subscription to a transmission in the form of an IGMP report (or "IGMP record message"). When it receives this report the gateway will itself send a report of the same type destined for the routers to which it is connected. In this way the information making it possible to route the multicast stream to the recipient will propagate among the routers. These IGMP reports will be intercepted by the access point which will maintain a table associating on the one hand the multicast address present in the "source address" field of the IGMP report and the MAC address ("Medium Access Control") of origin of the report. The exemplary embodiment of the invention describes a table, but it will be apparent to the person skilled in the art that any way of managing this association between a multicast address and the addresses of the clients of the local area network may be suitable, such as for example a list, a hash table or the like. The analysis of the report proper makes it possible to ascertain whether the client is joining or leaving the transmission group and to modify the table accordingly. Thereafter a filter implemented in the IP layer of the access point will process the multicast IP packets on the fly so as to transform them into unicast packets at the MAC level. The packets will therefore be intercepted and processed by the filter according to the exemplary embodiment while they are traversing the gateway. A multicast packet, referenced 2.1, will be detected and transformed into two unicast packets referenced 2.2 and 2.3, which will be despatched to the clients A and B belonging to the transmission group.

Figure 3:
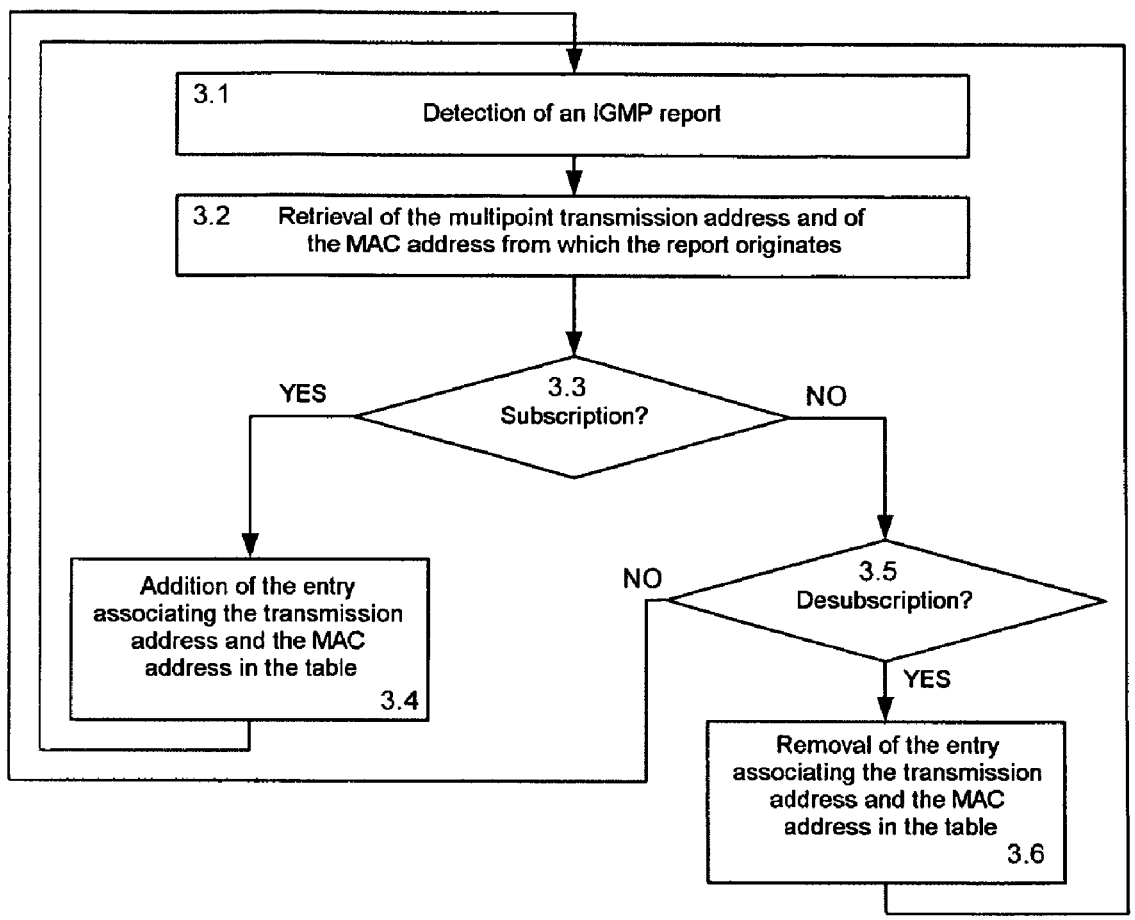
FIG. 3 details the steps of the processing by the gateway of an IGMP report of a client at a multicast transmission according to the exemplary embodiment of the invention.

A diagram illustrating the principal steps of the processing by the access point of the IGMP report is detailed in FIG. 3. In the case of the exemplary embodiment described, the gateway is the access point of the wireless network to which the clients will connect up, they will be said to associate in the case of a wireless network. The processing is implemented in the form of a filter, referenced 5.12, at the level of the MAC layer which will detect the IP packets corresponding to IGMP reports originating from the clients connected to the access point. The analysis of these reports makes it possible to extract therefrom the multicast address and the MAC address of the client from which the report originated. Any IGMP report contains group records indicating either the current status or the change of status of the interface identified by the MAC address as regards its membership of the multicast group. This information is coded in the "record type" field of the group record. This information will make it possible to maintain a table, referenced 5.10, on the gateway associating multicast addresses and a set of MAC addresses corresponding to the interfaces of the clients belonging to this transmission group. In addition to this mechanism making it possible to erase an association in the table when an IGMP report announcing that a client is leaving a multicast group is despatched, provision may be made also to erase an entry corresponding to a client that deassociates from the access point. Specifically, the client leaving the network therefore leaves the group.

Figure 4:
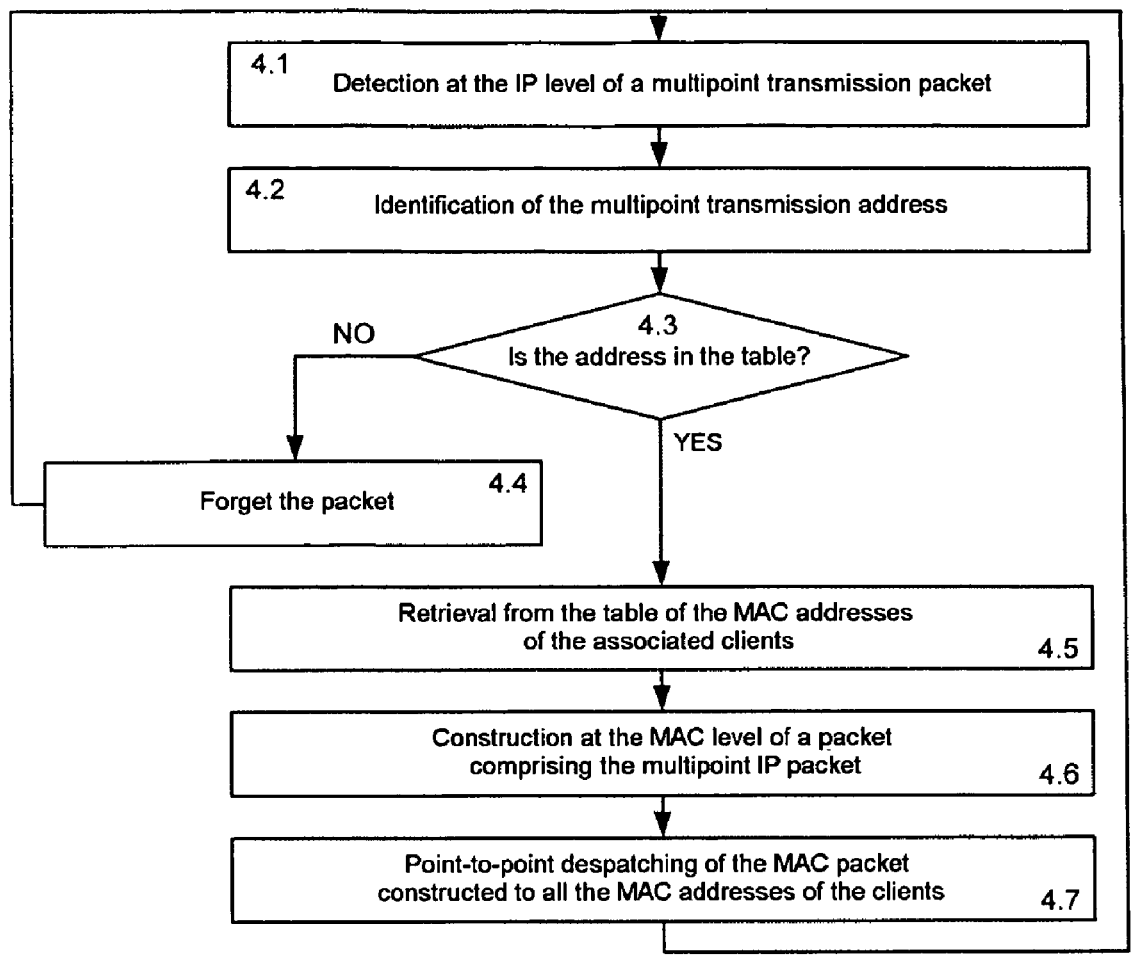
FIG. 4 details the steps of the processing of a packet transmitted in multicast mode by this gateway.

The processing of the packets arriving from the external network on the gateway in multicast mode may be done, for example, according to the diagram of FIG. 4. A filter referenced 5.11, is implemented, for example, at the level of the IP layer of the gateway. This filter will detect all the packets arriving in multicast mode at the gateway. For each packet of this arriving type, the multicast address will be extracted. This address will be searched for in the association table referenced 5.10. In the case where no record is found corresponding to this address it indicates that no client of the wireless network belongs to the transmission group, the packet can therefore be forgotten and will not be transported. If a record is found, the multicast IP packet, or a fragment of the latter, will be encapsulated in at least one MAC packet which will be despatched to all the MAC addresses indicated in the table. The mode of transmission of this MAC packet will be the unicast mode. The MAC packet will therefore be sent as many times as there are recipients. In this way these packets will benefit from the mechanism for correcting the errors of this mode of transmission at the MAC level. The reference of the MAC layer in the family of 802 protocols is "IEEE Std 802.11, 1999 Edition (Reaff 2003)". These packets will therefore be received by the MAC layer of the client which will extract the multicast IP packet therefrom and pass it to the IP layer. It is therefore seen that the method requires no modification of the client. Specifically, the unicast mode relates only to the MAC layer. The IP packet transported in the MAC packet remains a multicast IP packet as expected by the IP layer and the application from which the connection originates.

Figure 5:
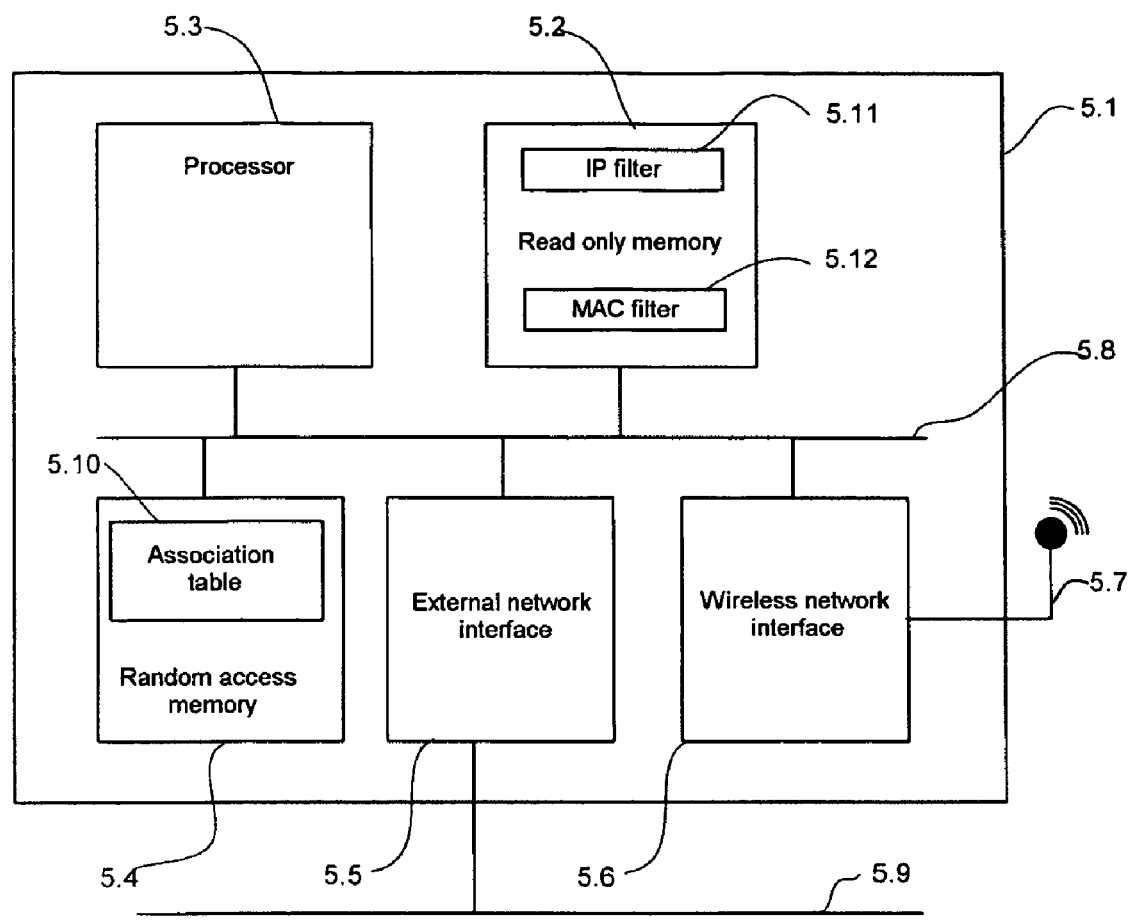
FIG. 5 details the architecture of a gateway operating according to the exemplary embodiment of the invention.

FIG. 5 illustrates the architecture of a gateway operating according to the exemplary embodiment of the invention. The gateway, referenced 5.1, comprises a processor, referenced 5.3, capable of executing programs stored in the read only memory, referenced 5.2 of the appliance after having transferred them into the random access memory, referenced 5.4. The appliance possesses at least two network interfaces. One, referenced 5.5, permits the connection of the appliance to the external network, referenced 5.9, for example the Internet. The other, referenced 5.6, drives wireless transporting means, referenced 5.7, allowing the connection of the clients of the local area network. These elements communicate via the bus referenced 5.8. The processor, 5.3, allows in particular the execution of the network layers including the MAC layer and the IP layer containing the filters, referenced 5.11 and 5.12, depending on the exemplary embodiment of the invention. The means of association between the MAC addresses of the clients and the multicast addresses are represented by an association table in random access memory referenced 5.10.

Figure 7:
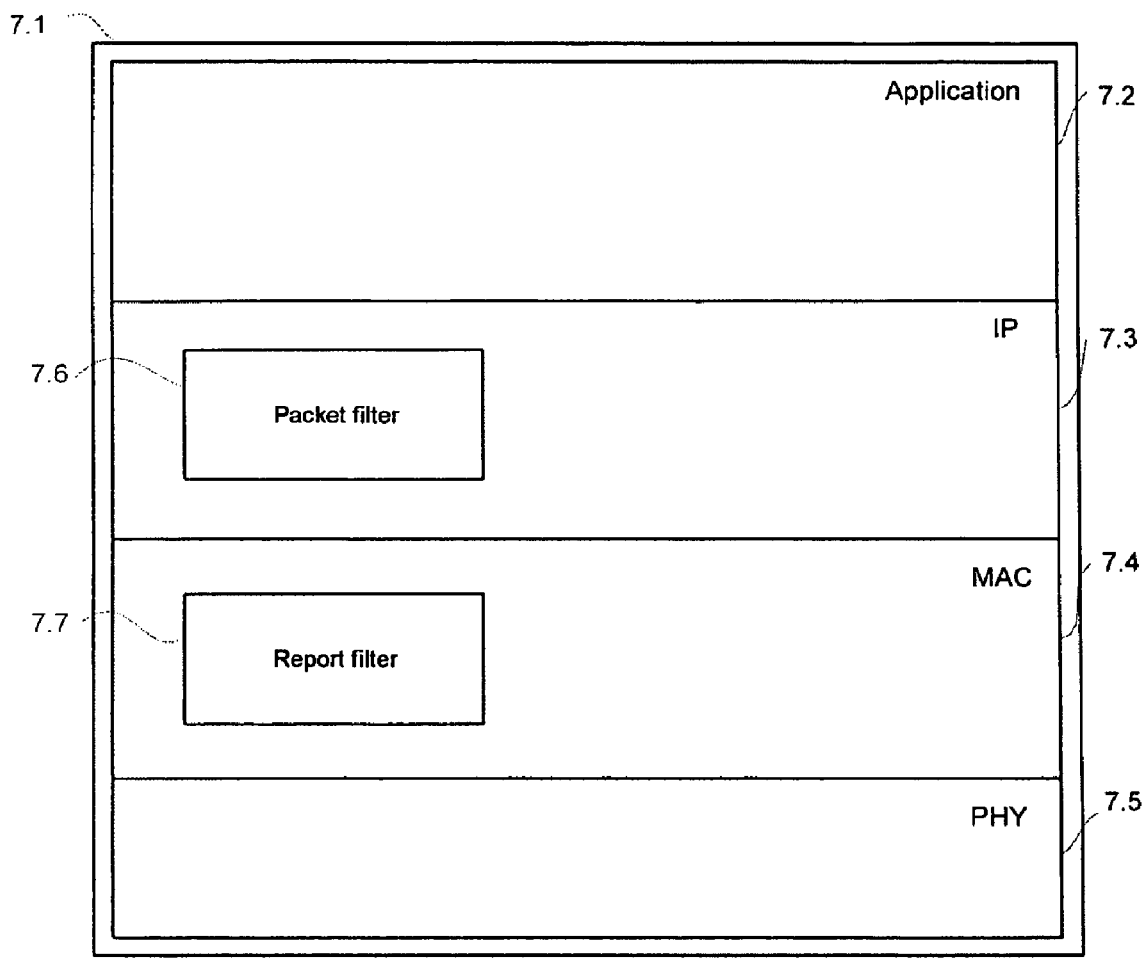
FIG. 7 illustrates the software architecture of the implementation of the exemplary embodiment of the invention.

FIG. 7 details the software architecture of these network layers. The network layers, referenced 7.1 comprise a physical layer, referenced 7.5 whose job is to interface directly with the communication medium both wireless and the connection to the external network which may be an Ethernet or ADSL connection for example. Just above the physical layer is the MAC layer, referenced 7.4, which affords an abstraction of the physical layer actually used. It is at this level that the filter, referenced 7.7, on the IGMP reports is implemented. The IP stack, referenced 7.3 lies above the MAC layer. It is here that the filter referenced 7.6 for the multicast IP packets will be found. The applications, referenced 7.2, use this IP stack to communicate.

An alternative implementation may consist in transporting the multicast packets received and not corresponding to any association in the table in multicast mode to the clients. In the converse case the multicast transporting at the MAC level over the local area network may be deactivated.

Figure 6:
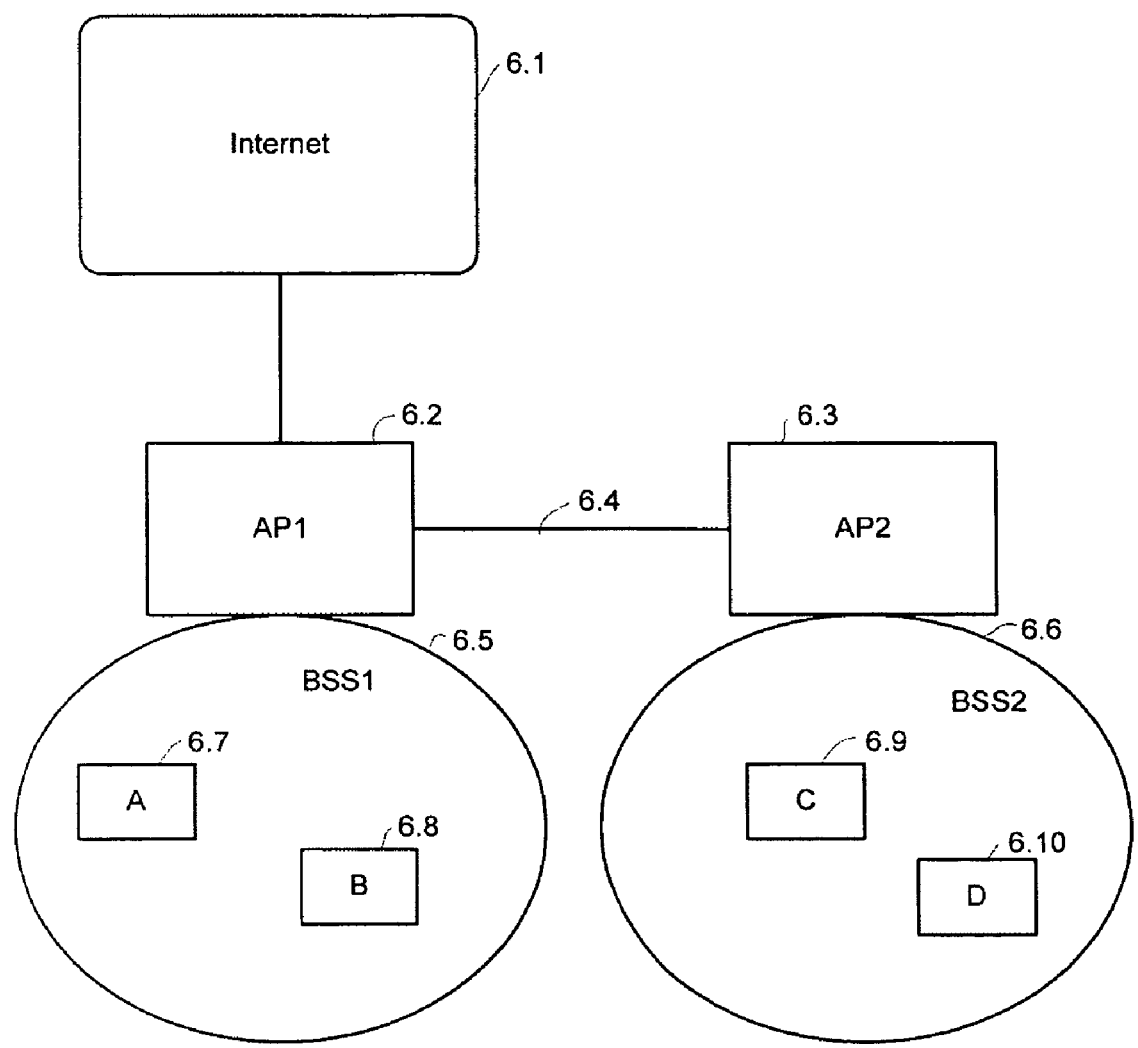
FIG. 6 illustrates a local area network possessing several points of access within the framework of the exemplary embodiment of the invention.

Certain wireless local area networks may contain several access points. This configuration is illustrated in FIG. 6. It shows a first access point AP1 referenced 6.2 connected to an exterior network, here the Internet referenced 6.1. This first access point covers a first access zone called BSS1 ("Basic Service Set") reference 6.5. In BSS1 two clients A and B, referenced 6.7 and 6.8, are connected to the access point AP1. A second access point AP2, referenced 6.3, also possesses a zone of coverage BSS2, referenced 6.6. Two clients C and D, referenced 6.9 and 6.10, are connected to this second access point AP2. The two access points are connected together by a network 6.4. This network may be a wire network such as Ethernet, a radio wireless link distinct from the networks constituted by the access points and their clients. A solution in which the second access point AP2 is a client belonging to the zone BSS1 of the first access point is also conceivable.

The manner of operation of the invention within this framework of a local area network including several access points will depend on the mode of operation of this second access point and on the way in which the packets will be routed in the network. Two cases should be distinguished, in a first case, the access point AP2 will operate as a router at the IP level. In this case, AP2 will appear in respect of the access point AP1 as one of its clients. The subscription to a multicast of a client of AP2 will be manifested as the subscription of AP2 to AP1 for this transmission. The multicast packets received by AP1 destined for AP2 will therefore be transported to it via a unicast transmission at the MAC level. These packets will be received by AP2 at the IP level as normal multicast packets. It is therefore necessary to implement the invention also on the access point AP2 so as to transport them in unicast mode to the clients of AP2.

In a second case, the access point AP2 will behave as a bridge over the MAC level, as described in standard 802.1d. In this case, the network constructed behind AP1 is seen at the IP level as a single network, the distributing of the packets by AP1 to the end clients, his own ones like those situated behind AP2 will be done at the MAC level. In this case, AP1 will transform the multicast IP packets arriving from the exterior network into unicast MAC packets which will be transported directly to the end client, directly or via AP2, without backtracking to the IP level. The clients will therefore receive these packets in unicast mode whether they are connected to AP1 or to AP2. In this case the invention operates without AP2 having to implement the invention.

In the case of the implementation of a roaming function such as described in standard 802.11f which allows a client connected to an access point to disconnect and to reconnect to a new access point without losing his IP connections. This is the second case in which the second access point implements a bridge function at the MAC level. The invention will therefore operate in a transparent manner at the level of the second access point.

In this case the invention will be implemented on each access point. A client deassociating from an access point in order to associate with another access point will be disconnected from all his current IP connections. The new access point will naturally take on board the multicast traffic destined for the client when the latter recreates his connections after his association to this new access point. In the case of a local area network the access points may implement roaming functions. In this case a client who changes access point will be able to retain his IP connections. This occurs by exchange of data between the access points as the client migrates from one point to another. It is therefore possible to include in the data exchanged by the access points during migration the data of the association table relating thereto. In this way the client's new access point can take on board the processing of the multicast packets intended for this client.

In the case of a minimal network, where a single client is connected to the gateway, it is possible to devise a simplified implementation where the filter on the IGMP reports in the MAC layer of the gateway will not be necessary. In this case, the association table becomes unnecessary. Only the filter on the multicast IP packets present in the IP layer of the gateway will be retained whilst simplifying its manner of operation. The gateway merely sends via the unicast mode of the MAC layer, the multicast IP packets received destined for the single client present on the network.

It will be apparent to the person skilled in the art that the invention, although described here within the framework of wireless networks, may be adapted to any type of local area network in so far as the latter has at its disposal a unicast mode immunised against the loss of packets while the multicast mode is not. Likewise, the person skilled in the art will be able to make modifications to the way of implementing the association between the transmission addresses and the clients as well as in the method used in the filters or their location without departing from the scope of the invention.

What is claimed is:

1. Method optimizing reliability of transmission of packets received in multicast mode from a first network to multicast transmission mode clients of a wireless second network, said method being implemented by a wireless access point device connecting said first network and said second network, said clients being directly connected to said wireless access point device through wireless connections and said packets originating from said first network being destined for clients of said second network, said method comprising the steps of:
  intercepting at least one subscription request to at least one multicast transmission group address, said at least one subscription request being sent to said first network by at least one of said clients of said second network, and transmission of said at least one subscription request to said first network;
  receiving from said first network, at least one multicast packet that is transmitted from said first network to said at least one multicast transmission group address;
  encapsulating at least a fragment of said at least one multicast packet transmitted from said first network into at least one unicast media control access layer packet; and,
  transmitting said at least one unicast media control access layer packet to each of said at least one of said clients of said second network that are subscribers to said multicast transmission group.

2. Method according to claim 1 wherein said second network comprising only one client, said packets received in multicast mode are transmitted directly in unicast mode to this one client.

3. Method optimizing reliability of transmission of packets received in multicast mode from a first network to multicast transmission mode clients of a wireless second network, said method being implemented by a wireless access point device connecting said first network and said second network, where said second network is a wireless network implementing at least one protocol from the 802.11 family, said packets originating from said first network being destined for clients of said second network, said clients being directly connected to said wireless access point device through wireless connections, said method comprising the steps of:
  intercepting at least one subscription request to at least one multicast transmission group address, said at least one subscription request being sent to said first network by at least one of said clients of said second network, and transmission of said at least one subscription request to said first network;
  receiving from said first network at least one multicast packet transmitted from said first network to said at least one multicast transmission group address;
  encapsulating at least a fragment of said at least one multicast packet transmitted from said first network into at least one unicast media control access layer packet; and,
  transmitting said at least one unicast media control access layer packet to each of said at least one of the clients of the first second network that are subscribers to said multicast transmission group.

4. Method according to claim 3 wherein said second network comprising only one client, the packets received in multicast mode are transmitted directly in unicast mode to this one client.

5. Method optimizing reliability of transmission of packets, received in multicast mode from a first network to multicast transmission mode clients of a wireless second network, by a wireless access point device connecting said first network and said second network, said clients being directly connected to said wireless access point device through wireless connections and said packets originating from said first network being destined for clients of said second network, said method comprising the steps of:
  intercepting at least one subscription request to at least one multicast transmission group address from at least one of said clients of the said second network that is a subscriber to a multicast transmission group, said at least one subscription request being sent to said second network by at least one of said clients of the second network;
  associating said multicast transmission group to at least one media access control address of said at least one of said clients being an origin of said at least one subscription request, said media access control address corresponding to an interface of said at least one of said clients that is a subscriber to said transmission group;
  receiving from said second network at least one multicast packet transmitted from said first network to said at least one multicast transmission group;
  encapsulating at least a fragment of said at least one multicast packet transmitted from said first network into at least one media access control packet; and,
  transmitting said at least one unicast media access control packet to said media access control address corresponding to an interface of said at least one of said clients when an association exists between a transmission group of said at least one multicast packet and said at least one media access control address.

* * * * *